(12) United States Patent
Binley et al.

(10) Patent No.: US 9,339,050 B2
(45) Date of Patent: May 17, 2016

(54) PROCESS FOR PRODUCING SHAPED FROZEN CONFECTIONS

(71) Applicant: Conopco, Inc., Englewood Cliffs, NJ (US)

(72) Inventors: Gary Norman Binley, Kettering (GB); Lalita Wathanakul, Shanghai (CN)

(73) Assignee: CONOPCO, INC., Englewood Cliffs, NJ (US)

( * ) Notice: Subject to any disclaimer, the term of this patent is extended or adjusted under 35 U.S.C. 154(b) by 59 days.

(21) Appl. No.: 14/357,830

(22) PCT Filed: Nov. 20, 2012

(86) PCT No.: PCT/EP2012/073067
§ 371 (c)(1),
(2) Date: May 13, 2014

(87) PCT Pub. No.: WO2013/076060
PCT Pub. Date: May 30, 2013

(65) Prior Publication Data
US 2014/0302215 A1    Oct. 9, 2014

(30) Foreign Application Priority Data

Nov. 21, 2011   (WO) ................ PCT/CN2011/001930
Jan. 19, 2012   (EP) ..................................... 12151785

(51) Int. Cl.
*A23G 3/12*    (2006.01)
*A23G 9/08*    (2006.01)
(Continued)

(52) U.S. Cl.
CPC .............. *A23G 9/083* (2013.01); *A23G 3/0031* (2013.01); *A23G 3/0053* (2013.01);
(Continued)

(58) Field of Classification Search
CPC ......... A23G 9/083; A23G 9/221; A23G 9/32; A23G 9/42; A23G 9/34; A23G 9/44; A23G 3/0025–3/0042; A23G 3/0252–3/0294; A23G 3/0053–3/0055; A23G 3/12–3/125; A23P 1/105; A23L 1/0073; A23L 1/05–1/059; A23L 3/36–3/364
USPC .......................... 426/524, 515, 512, 573–579
See application file for complete search history.

(56) References Cited

U.S. PATENT DOCUMENTS 2,558,453 A * 6/1951 Minster .................... A23G 9/46
                                                                426/306
4,413,461 A * 11/1983 Waldstrom ........... A23G 3/0289
                                                                425/126.2
(Continued)

FOREIGN PATENT DOCUMENTS

EP         0040989 A2    12/1981
EP         0827696 A2     3/1998
(Continued)

OTHER PUBLICATIONS www.jamiecooksitup.net/2011/07/frozen-jello-pops/ , 2011.*
(Continued)

*Primary Examiner* — Drew Becker
(74) *Attorney, Agent, or Firm* — Foley & Lardner LLP

(57) ABSTRACT

A process for producing a frozen confectionery product is provided, the process comprising: preparing a mix containing a gelling agent and having a total solids content of from 20 to 45 wt %; filling the mix into a mold and allowing the gelling agent to form a gel in the mold; freezing the gelled mix to form a product having a first form; removing the shaped product from the mold; and deforming the product while it is in the frozen state so that it takes up a second form.

11 Claims, 1 Drawing Sheet

(51) Int. Cl.
- *A23L 1/054* (2006.01)
- *A23L 1/0526* (2006.01)
- *A23G 3/02* (2006.01)
- *A23G 9/22* (2006.01)
- *A23L 1/0532* (2006.01)
- *A23P 1/10* (2006.01)
- *A23G 3/34* (2006.01)
- *A23L 3/36* (2006.01)
- *A23L 1/00* (2006.01)
- *A23G 9/44* (2006.01)
- *A23G 9/32* (2006.01)
- *A23G 9/34* (2006.01)

(52) U.S. Cl.
CPC ............... *A23G 3/0268* (2013.01); *A23G 3/12* (2013.01); *A23G 9/221* (2013.01); *A23G 9/32* (2013.01); *A23G 9/34* (2013.01); *A23G 9/44* (2013.01); *A23L 1/0073* (2013.01); *A23L 1/0526* (2013.01); *A23L 1/0532* (2013.01); *A23L 1/0545* (2013.01); *A23L 3/36* (2013.01); *A23P 1/105* (2013.01)

(56) References Cited

U.S. PATENT DOCUMENTS

| | | | | |
|---|---|---|---|---|
| 4,761,128 A * | 8/1988 | Fowler | ............... | A23G 9/26 425/126.2 |
| 5,948,456 A * | 9/1999 | Jones | ............... | A23G 1/207 426/100 |
| 6,171,634 B1 * | 1/2001 | Marjanovic | ............ | A23L 1/0522 426/516 |
| 6,231,901 B1 | 5/2001 | Sharkasi et al. | | |
| 6,379,724 B1 * | 4/2002 | Best et al. | ............... | A23G 9/322 426/100 |
| 6,461,653 B1 | 10/2002 | Cox | | |
| 6,596,334 B1 * | 7/2003 | Flickinger | ............ | A23G 3/0268 426/573 |
| 6,645,538 B2 * | 11/2003 | Best | ............... | A23G 9/083 426/100 |
| 7,572,472 B2 * | 8/2009 | Hermansen | ............. | A23G 3/004 426/389 |
| 2001/0041208 A1 | 11/2001 | Orris et al. | | |
| 2002/0192337 A1 | 12/2002 | Best et al. | | |
| 2003/0026882 A1 * | 2/2003 | Poorman | ............... | A23G 9/083 426/573 |
| 2003/0064137 A1 | 4/2003 | Cathenaut et al. | | |
| 2004/0213878 A1 * | 10/2004 | Woodhouse | ....... | A21D 13/0087 426/383 |
| 2005/0048168 A1 * | 3/2005 | Koxholt | ................ | A23G 9/34 426/100 |
| 2005/0072321 A1 | 4/2005 | Larsen | | |
| 2011/0014343 A1 * | 1/2011 | Jordan | ................ | A23L 1/0026 426/512 |

FOREIGN PATENT DOCUMENTS

| | | |
|---|---|---|
| EP | 0827696 A3 | 1/1999 |
| EP | 1366897 A1 | 3/2003 |
| GB | 2074082 A1 | 10/1981 |
| WO | WO9011481 | 11/1990 |
| WO | WO02071862 A2 | 9/2002 |

OTHER PUBLICATIONS

Marshall et al., Ice Cream, 2003, 296.
PCT International Search Report and Written Opinion on Appln. No. PCT/EP2012/073067 dated Jan. 2, 2013.
European Search Report on Application No. EP12151785 dated Dec. 17, 2012.
IPRP2 in PCTEP2012073067, Oct. 18, 2013.
Written Opinion in EP12151785, Dec. 17, 2012.

* cited by examiner

PROCESS FOR PRODUCING SHAPED FROZEN CONFECTIONS

TECHNICAL FIELD OF THE INVENTION

The present invention relates to a process for producing frozen confectionery products that are shaped in three dimensions. In particular, it relates to a process for producing frozen confectionery products which change their shape.

BACKGROUND TO THE INVENTION

There is a demand for frozen confectionery products with interesting and distinctive shapes. Three-dimensional shaped products can be produced by moulding, for example using a rubber mould or a split mould. Unfrozen or partially frozen mix is placed into the mould and then frozen. The product is then removed from the mould—either by peeling it off the product in the case of rubber moulds, or separating the parts of a split mould. For example, GB 2 074 082 and EP 1 366 897 disclose methods for producing 3D shaped frozen confections by applying pressure to a slug of frozen confection using a split mould.

WO 02/071862 discloses a different type of shaped frozen confection which contain a frozen gel which develops flexibility during warming to room temperature.

Consumers (especially children) are always looking for new and exciting products. Therefore there remains a need for improved frozen confectionery products that are shaped in three dimensions.

BRIEF DESCRIPTION OF THE INVENTION

We have developed a frozen confectionery product that is shaped in three dimensions, and which changes its shape as it warms up when it is removed from frozen storage. Thus the product transforms from one shape into another before the consumer's eyes. Accordingly, in a first aspect the present invention provides a process for producing a frozen confectionery product, the process comprising:
  a) preparing a mix containing a gelling agent and having a total solids content of from 20 to 45 wt %;
  b) filling the mix into a mould and allowing the gelling agent to form a gel in the mould;
  c) freezing the gelled mix to form a product having a first form;
  d) removing the shaped product from the mould; and
  e) deforming the product whilst it is in the frozen state so that it takes up a second form.

This process results in frozen products which have one shape (the second form) when they are removed from frozen storage, but which transform to a different shape before the consumer's eyes (the first form) as they warm up i.e. they shape-shift. The shape changing effect is achieved by the fact that the product is gelled before it is frozen, and after freezing it is deformed to a second shape. The new shape remains while the product is frozen. However, because of its elastic nature, the gel retains the memory of the first shape. Therefore as the product warms and the ice content reduces the product reverts back to its original shape, providing extra interest and excitement for the consumer.

In one embodiment, the gelling agent is a thermally setting gelling agent. Alternatively, the gelling agent may be a chemically set gelling agent.

Preferably the mix has a solids content of from 25 to 40 wt %, more preferably from 30 to 35 wt %.

Steps (c) and (d) may take place in either order, but in a preferred embodiment, step (c) takes place before step (d).

Preferably the product is tempered to a desired temperature and ice content between steps (d) and (e). More preferably the product is tempered at between −15 and −10° C.

Preferably in step (e) the product is deformed by pressure forming.

Preferably the product is hardened after step (e), for example in a hardening tunnel or cold store. Preferably the product is then packaged and stored at temperature below −18° C.

In a second aspect, the present invention provides a product obtained or obtainable by the process of the first aspect of the invention.

BRIEF DESCRIPTION OF THE DRAWINGS

FIG. 1 shows a series of images of the resulting product. FIG. 1 (a) shows the product just after it had been removed from frozen storage. FIGS. 1(b) and (c) show the product changing shape as the ice melts. FIG. 1(d) shows the product when it has reverted to its original (gelled) shape.

DETAILED DESCRIPTION OF THE INVENTION

Unless defined otherwise, all technical and scientific terms used herein have the same meaning as commonly understood by one of ordinary skill in the art (e.g. in frozen food manufacture). Definitions and descriptions of various terms and techniques used in frozen confectionery manufacture are found in "Ice Cream", 6$^{th}$ Edition R. T. Marshall, H. D. Goff and R. W. Hartel, Kluwer Academic/Plenum Publishers, New York 2003.

Frozen confections are sweet-tasting fabricated foodstuffs intended for consumption in the frozen state (i.e. under conditions wherein the temperature of the foodstuff is less than 0° C., and preferably under conditions wherein the foodstuff comprises a significant amount of ice). Frozen confections include water ices, fruit ices, ice creams, frozen yoghurts, sorbets and the like.

The mix is a solution and/or suspension of other ingredients, especially those typically used in frozen confections, such as sugars, fats, proteins, emulsifiers, stabilisers, colours, flavours etc. Thus the mix may be a water ice mix which typically comprises water and one or more of sugars, stabilisers, colours and flavours, but little or no fat or protein (e.g. less than 5 wt % of each, preferably less than 2 wt %). Alternatively, the mix may be an oil-in-water emulsion, such as an ice cream mix, which contains small emulsified fat droplets (i.e. 50 µm or less in diameter, preferably smaller than 10 µm).

The mix has a solids content of from 20 to 45 wt %, preferably 25 to 40 wt %, more preferably from 30 to 35 wt %. We have found that solids contents in these ranges result in the best shape memory. Lower solids contents produce high ice contents which can result in reduced integrity of the gel following deformation. Higher solids content produce low ice contents which means that there is insufficient ice present to retain the shape after deformation. The total solids content of a frozen particle is its dry weight, i.e. the sum of the weights of all the ingredients other than water, expressed as a percentage of the total weight. It is measured by the oven drying method as described in Ice Cream, 6th Edition, Marshall et al. (2003) p 296.

The mix may be aerated or unaerated. Overrun is typically produced by intentionally incorporating gas into the product, such as by mechanical agitation. The gas can be any foodgrade gas such as air, nitrogen or carbon dioxide. Mixes that are not intentionally aerated may nonetheless contain a small amount of gas which is incorporated during processing of the mix. For aerated mixes, the overrun is preferably at least 60%, more preferably at least 80%. It is preferable that the overrun does not exceed 200%, more preferably the overrun is less than 150%, most preferably less than 100%. Overrun is measured at atmospheric pressure and is defined by $$\text{overrun \%} = \frac{\text{density of mix} - \text{density of ice cream}}{\text{density of ice cream}} \times 100$$

The mix comprises a gelling agent, which may be a thermoreversible gelling biopolymer such as gelatine or agar. In this case, the mix is maintained at a sufficiently high temperature to prevent gel formation until step (b) of the process by lowering the temperature of the mix thereby causing the mix to gel in the first mould. Alternatively the gelling agent may be a chemically setting gelling biopolymer which derives its gel structure from an interaction between the biopolymer and an appropriate ion such as $Ca^{2+}$. Examples include sodium alginate, iota-carrageenan, kappa-carrageenan and pectin. In this case, the biopolymer and the ion are kept separate until step (b) of the process.

The gelling agent could also be a synergistic combination of two or more biopolymers that may be individually non-gelling, but on mixing will form a gel or a gel of a higher modulus. Examples include: sodium alginate with pectin, xanthan with locust bean gum, agar with locust bean gum, and kappa carrageenan with locust bean gum. Synergistic combinations of biopolymers can be thermally or chemically setting.

The gelling agent is present in the mix in an amount that the gel is sufficiently strong to cause the product to revert to its first shape as it warms up. Gel strength can be increased by increasing the amount of the gelling agent in the mix.

In the first step of the process according to invention, the mix is prepared, for example in the normal manner for frozen confection mixes. Typically the sugars and stabilisers are mixed to form a dry blend before being added into water with heating and stirring. The mix is then preferably pasteurized, and may also be homogenized if desired.

In step (b) of the process, the mix is filled into the first mould, typically at a temperature of around 50° C. The mould is preferably either a rubber mould or a metal split mould. At this point, the gel is formed, either by lowering the temperature (for thermally setting gelling agents) or by combining two separate mix streams, each of which contains one of the components of a chemically setting gelling agent. For example, the mix may be made in two parts, one containing sodium alginate and the other containing a source of $Ca^{2+}$ ions. When the two mixes are combined in the mould, the alginate reacts with the $Ca^{2+}$ to form the gel. If the gelling agent in the mix is a chemically set gelling agent, it is also possible to partially slush freeze the mix before filling into the mould.

The gelled mix is then frozen. Freezing must not be so rapid that it happens before the product is gelled. For thermally set gelling agents, cooling to initiate gel formation and freezing the product can both be achieved by placing the mould in a low temperature environment. Standard quiescent freezing by placing the filled mould into a tank of cold brine is a suitable method. A stick may be inserted into the mix during the freezing process.

Once the gelled mix has frozen, the next step in the process requires that the product (or at least the parts of it close to the surface) is at a temperature such that it has the desired ice content for deformation. Sufficient ice is required to retain the second form, but there should not be so much ice present that the integrity of the gel is damaged during deformation. Preferably the ice content is from 40 to 50 wt % during step (e) of the process, for example about 45 wt %. For a typical mix solids content of about 35 wt %, the temperature which produces this ice content is in the range of −15 to −10° C. Higher mix solids content require a lower tempering temperature to achieve the same ice content, and vice versa. The correct surface temperature can be achieved by exposing the product to ambient temperature for a certain time (the "dwell time") after demoulding the product in step (d). Demoulding is typically achieved by warming the surface of the mould in order to heat the product. The dwell time allows the surface temperature of the product to equilibrate after the heat input during demoulding. The dwell time is preferably at least 20 seconds, more preferably at least 60 seconds, and preferably less than 5 minutes, more preferably less than 3 minutes.

The frozen, gelled mix is removed from the mould, preferably after freezing, although it may be removed from the mould and then subsequently frozen. The frozen, gelled mix is then deformed, preferably by means of pressure forming. The deformation may consist of a change in the shape of the product, or a change in the size of the product (i.e. compression) or a combination of both. Pressure forming is a known technique for forming blank pieces of frozen confection into 3D shapes, for example as in GB 2 074 082 and EP 1 366 897. The product must have sufficiently high ice content such that it maintains the second form after deformation, i.e. the second form is frozen in place. The temperature at which the ice content is high enough for the product to maintain its second form depends on the formulation of the mix, in particular the solids content. A lower temperature is needed to achieve the required ice content when the product has a high solids content. On the other hand, the ice content of the product must not be so high that the product is too hard to be deformed in step (e), i.e. the product must be sufficiently plastic to be deformable. Aerating the mix before freezing can affect the deformability of the product, by making it softer and more compressible.

Finally, the product may be hardened to a temperature (for example by passing it though a hardening tunnel or placing into a cold store at below −20° C.), packaged, stored and distributed for sale.

Once the consumer removes the product from frozen storage, it begins to warm up. The ice structure that stabilises the second form therefore weakens and the product reverts to the first form that is "remembered" by the gel. Thus the product can change from one shape to another (e.g. from a cat to a dog), or, if it had been compressed, it will expand. If only certain areas of the product had been compressed, the effect of the subsequent expansion could be to cause a flower to bloom or a mouth to open, etc.

The present invention will now be described with reference to the following example and Figures, wherein FIG. 1 shows a series of images of a product produced by the process of the present invention as it transforms from the second (frozen) form to the first (gelled) form during warming.

Example 1

A mix was prepared according to the formulation shown in the table below.

| Ingredient | Amount (wt %) |
|---|---|
| Sucrose | 2.0 |
| Dextrose powder | 17.0 |
| Dextrin powder (15 DE) | 2.0 |
| High fructose corn syrup (94DE, 71% solids) | 15.0 |
| Citric Acid | 0.5 |
| Gum Blend | 0.4 |
| Citrate | 0.25 |
| Colour and flavour | 0.31 |
| Water | To 100 |

The gum blend was composed of 55% sodium alginate, 20% locust bean gum, 15% carrageenan, 9% gellan gum and 1% xanthan (this combination of biopolymers that sets when the temperature is lowered). The carrageenan was a mixture of Kappa & Iota carrageenan (Danisco Grindsted carrageenan CL110).

The dry ingredients were blended, and then added into hot water, together with the liquid corn syrup. The resulting mix was pasteurized at 80° C., and then cooled to around 35° C., before being filled into metal split moulds. The moulds were placed in brine bath at −36° C. The mix gelled as it cooled down, and then subsequently froze. A stick was inserted into the partially frozen mix. The moulds were removed from the brine bath and the frozen products de-moulded. They were exposed to ambient temperature for a dwell time of about 1 minute. Then the products were deformed to produce the second form by pressure forming at −15° C. Finally, products were placed in a cold store at below −20° C.

FIG. 1 shows a series of images of the resulting product. FIG. 1 (a) shows the product just after it had been removed from frozen storage. FIGS. 1(b) and (c) show the product changing shape as the ice melts. FIG. 1(d) shows the product when it has reverted to its original (gelled) shape.

The various features and embodiments of the present invention, referred to in individual sections above apply, as appropriate, to other sections, mutatis mutandis. Consequently features specified in one section may be combined with features specified in other sections, as appropriate.

The invention claimed is:

1. A process for producing a frozen confectionery product, the process comprising:
   a) preparing a mix containing a thermally setting gum gelling agent and having a total solids content of from 20 to 45 wt %,
      wherein the thermally setting gum gelling agent is present in the mix at 0.4 wt %;
   b) filling the mix into a mould and allowing the thermally setting gum gelling agent to form an unfrozen gel mix in the mould;
   c) freezing the unfrozen gel mix to form a product having a first form;
   d) removing the product having the first form from the mould; and
   e) deforming the product having the first form whilst the product is in the frozen state so that the product takes up a second form.

2. The process according to claim 1, wherein the mix has a solids content of from 25 to 40 wt %.

3. The process according to claim 2, wherein the mix has a solids content of from 30 to 35 wt %.

4. The process according to claim 1, wherein step c) takes place before step (d).

5. The process according to claim 1, wherein the product having the first form is tempered to a desired temperature and ice content between steps d) and e).

6. The process according to claim 5, wherein the product having the first form is tempered at between −15 and −10° C.

7. The process according to claim 1, wherein in step e) the product having the first form is deformed by pressure forming.

8. The process according to claim 1, wherein the product having the second form is hardened after step e).

9. The process according to claim 1, wherein the product having the second form is stored at a temperature below −18° C.

10. The process according to claim 1, wherein the thermally setting gum gelling agent is a gum blend composed of sodium alginate, locust bean gum, carrageenan, gellan gum and xanthan.

11. The process according to claim 10, wherein the gum blend is composed of 55 wt % of the blend sodium alginate, 20 wt % of the blend locust bean gum, 15 wt % of the blend carrageenan, 9 wt % of the blend gellan gum and 1 wt % of the blend xanthan.

* * * * *